(12) United States Patent
Habenschaden et al.

(10) Patent No.: US 12,709,050 B2
(45) Date of Patent: Aug. 18, 2026

(54) APPARATUS FOR FORMING PLASTIC PREFORMS INTO PLASTIC CONTAINERS WITH STERILIZABLE ASEPTIC VALVE

(71) Applicant: KRONES AG, Neutraubling (DE)

(72) Inventors: Nina Habenschaden, Regensburg (DE); Armin Buess, Regensburg (DE); Konrad Senn, Alteglofsheim (DE); Thomas Hoellriegl, Teublitz (DE)

(73) Assignee: KRONES AG, Neutraubling (DE)

( * ) Notice: Subject to any disclaimer, the term of this patent is extended or adjusted under 35 U.S.C. 154(b) by 121 days.

(21) Appl. No.: 18/423,150

(22) Filed: Jan. 25, 2024

(65) Prior Publication Data

US 2024/0246282 A1 Jul. 25, 2024

(30) Foreign Application Priority Data

Jan. 25, 2023 (DE) ..................... 10 2023 101 834.5

(51) Int. Cl.
*B29C 49/42* (2006.01)

(52) U.S. Cl.
CPC .. *B29C 49/42093* (2022.05); *B29C 49/42834* (2022.05); *B29C 49/4289* (2013.01)

(58) Field of Classification Search
CPC ........ B29C 49/42834; B29C 49/42405; B29C 49/4289; B29C 49/42093; B29C 2949/0715; B29C 2049/4635; B29C 49/12; B29C 2049/7832; B29C 2049/4697; B29C 2049/4679; B29C 49/36; B29C 2049/7833; B29L 2031/7158; A61L 2/208
See application file for complete search history.

(56) References Cited

U.S. PATENT DOCUMENTS 5,878,992 A 3/1999 Edwards et al.
9,919,469 B2 3/2018 Handschuh et al. .... B29C 49/42
(Continued)

FOREIGN PATENT DOCUMENTS

| DE | 102013110088 | 3/2015 | ............ B29C 49/42 |
|---|---|---|---|
| EP | 3825097 | 5/2021 | |
| WO | WO2005036039 | 4/2005 | ............ F16K 37/00 |

OTHER PUBLICATIONS

German Search Report issued in DE Patent Appln. No. 102023101834.5, dated Jul. 12, 2023, with machine English translation, 8 pages.
(Continued)

*Primary Examiner* — Monica A Huson
(74) *Attorney, Agent, or Firm* — HAYES SOLOWAY P.C.

(57) ABSTRACT

An apparatus for forming plastic preforms into plastic containers, has a plurality of forming stations each having application devices that apply the plastic preforms with a flowable and gaseous medium for their expansion. The apparatus has at least one first compressed air reservoir configured to store compressed air at a first predefined pressure. Each forming station has a valve arrangement with a plurality of valve devices configured to apply the plastic preforms with at least two pressures, wherein at least one of the valve devices is a pneumatically-controlled valve device. This valve device has a working chamber for receiving gaseous medium, used to act upon the plastic preforms, and a valve piston that can be moved between at least two positions. The valve device further has a control chamber that can be applied with a gaseous control medium for moving the valve piston.

16 Claims, 2 Drawing Sheets

(56) References Cited

U.S. PATENT DOCUMENTS

| | | | |
|---|---|---|---|
| 11,123,913 B2 | 9/2021 | Hoellriegl et al. | B29C 49/42 |
| 2013/0280127 A1 | 10/2013 | Voth | |
| 2015/0076746 A1 | 3/2015 | Handschuh et al. | |
| 2020/0238592 A1 | 7/2020 | Hayakawa et al. | |
| 2021/0146595 A1 | 5/2021 | Handschuh et al. | |

OTHER PUBLICATIONS

Extended European Search Report issued in EP Patent Appln. Serial No. 23214612.6-1014, dated Aug. 30, 2024, with machine English translation, 25 pages.

European Partial Search Report issued in EP Patent Appln. No. 23214612.6, dated Jun. 4, 2024, with machine English translation, 34 pgs.

APPARATUS FOR FORMING PLASTIC PREFORMS INTO PLASTIC CONTAINERS WITH STERILIZABLE ASEPTIC VALVE

CROSS REFERENCE TO RELATED APPLICATIONS

This application claims priority to German Patent Application Ser. No. 10 2023 101 834.5, filed Jan. 25, 2023, the contents of which are incorporated herein by reference.

BACKGROUND OF THE INVENTION

The present invention relates to an apparatus and a method for forming plastic preforms into plastic containers. Such apparatuses and methods have long been known from the prior art. In this process, heated plastic preforms are typically formed into plastic containers and, in particular, plastic bottles by being applied with compressed air. For this purpose, the plastic preforms are applied with at least two, and more recently several, different pressure levels. Typically, a plurality of forming stations are arranged on a rotatable carrier—the so-called blowing wheel. The individual forming stations in each case have valve blocks or valve arrangements with a plurality of valves. Some of these valves are pneumatically-controlled valves.

More recently, blow-molding machines or forming devices, which form the containers under aseptic or sterile conditions, have also become known. This means that the forming process is also carried out with sterile air.

This means that, in the prior art, but preferably also in the case of the invention, the blow-molding machine is sterilized with a sterilization medium, such as hydrogen peroxide, in a sterilization mode that is different from a production mode. After sterilization mode, the containers are formed under sterile conditions with sterile air, and in particular filtered air. During sterilization mode, the valve blocks or valves are also sterilized with sterilization medium.

During working mode, however, the respective control air for actuating the valves is typically not sterile.

For valve arrangements or valve blocks in a sterile room or, in general, an aseptic room, it should be ensured that the aseptic blowing air to be switched is not contaminated with the control air of the valves. For this reason, the prior art sometimes requires the regions through which the blowing air flows to be hermetically sealed from the control air. For this purpose, for example, the lifting valve can be hermetically sealed from the valve housing by means of a bellows or a diaphragm. Blow blocks or valve arrangements known from the prior art cannot be sterilized because, on the one hand, the sterility limits are not defined and, on the other hand, the materials are not suitably designed. In particular, prior art valve devices cannot be sterilized if they do not have a separating diaphragm or bellows.

In practice, such bellows can tear. In addition, such valves have the disadvantage that they require a larger installation space compared to a bellowless valve. In addition, the geometries of such bellows or the materials are typically at their load limits. Furthermore, the material of the bellows becomes soft after sterilization due to a high temperature, so that defects can arise in the bellows if production is started immediately.

In addition, such a valve requires two pilots and/or control pressures for opening and closing, which leads to higher costs and a larger space requirement.

The present invention is therefore based upon the object of providing a blow-molding machine which is more versatile—in particular, for sterile room applications—but which also simplifies the actual blowing process—in particular, when applied with different pressures.

SUMMARY OF THE INVENTION

An apparatus according to the invention for forming plastic preforms into plastic containers has a transport device, which transports the plastic preforms along a predefined transport path. The transport device has a (movable and in particular rotatable) transport carrier on which a plurality of forming stations for forming the preforms into plastic containers are arranged, wherein such forming stations in each case have application devices that apply the plastic preforms with a flowable and in particular gaseous medium for their expansion (and/or are suitable and intended for this purpose).

In addition, the apparatus has at least one first compressed air reservoir that is suitable and intended to store compressed air at a first predefined pressure, and each forming station has a valve arrangement with a plurality of valve devices in order to subject the plastic preforms to at least two (in particular, different) pressures.

Furthermore, at least one of such valve devices is a pneumatically-controlled valve device.

According to the invention, this valve device has a working chamber for receiving the gaseous medium, used to act upon the plastic preforms, and a valve piston that can be moved between at least two positions. Furthermore, the valve device has a control chamber that can be applied with a gaseous control medium for moving the valve piston. At least one transition region is arranged between the working chamber and the control chamber.

Preferably, this transition region serves to delimit or separate the working chamber and the control chamber. In this way, the control chamber can be applied with non-sterile air, without it reaching the working chamber.

Particularly preferably, this transition region has a transition chamber. This transition chamber can also be filled with a sterile medium during operation, for example. Therefore, the transition region acts as a gray room which separates the aseptic working chamber from the non-aseptic control chamber. Preferably, the control chamber can also be applied with non-sterile air. The transition region is preferably used as a hygiene bridge.

Thus, a valve device is proposed, which is aseptic and preferably bellowless, and which is preferably defined or constructed by at least three zones. Preferably, the working chamber is located in one of these zones, the control chamber in another, and preferably a transition zone is arranged between these two zones and/or chambers.

Thus, the first zone is preferably an aseptic chamber, in which the aseptic process air can flow, wherein the valve device is suitable and intended to connect this aseptic chamber or the working chamber to the container to be expanded or to separate it therefrom.

Particularly preferably, the working chamber and/or the transition region and preferably the working chamber and the transition region can be sterilized. This means that both the working chamber or this zone together with the working chamber can be sterilized. The transition zone, which, as mentioned above, forms a gray room, is also preferably sterilizable.

In a further preferred embodiment, the control chamber is sealed off from the transition region by means of at least one first sealing device. This sealing device can be a sealing ring, for example.

In a further preferred embodiment, the transition region is sealed off from the working chamber with at least one second sealing device. This second sealing device is also preferably a sealing ring.

Particularly preferably, the first sealing device and the second sealing device are from one another in a longitudinal direction of the valve device and/or a direction of movement of the piston device.

Particularly preferably, at least one further sealing device and preferably two further sealing devices are arranged between the first sealing device and the second sealing device.

In a further advantageous embodiment, a first sealing device, which seals off the control chamber from the sealing region and/or the transition region, is arranged in such a way that it never contacts an aseptic region of the valve arrangement (in particular, also independently of a position of the valve piston).

Preferably, the mentioned gray room or the transition region is separated from the aseptic chamber or the working chamber by at least one sealing device. As mentioned above, this gray room is preferably sterilizable.

Furthermore, as mentioned above, a control chamber is provided which is separated from this transition region by at least one sealing device and which preferably moves the piston device (for example, from a closed to an open position or vice versa)—in particular in the event of a change in control pressure.

As mentioned, the sealing devices of this control chamber are designed in such a way that they never contact a surface of the aseptic chamber, i.e., the working chamber.

This transition region preferably serves both as a hygiene bridge and particularly preferably as a compression spring for pretensioning the piston device.

In a further advantageous embodiment, a further valve device and in particular a pilot valve is provided. This pilot valve preferably controls the control air for opening the piston device. Furthermore, a lower pilot pressure can be used to close the piston via an air spring, for example, and/or to move it into a closed position of the valve device.

The chamber controlled by the air spring can preferably be additionally sterilized, as shown in more detail below. Preferably, the pressure in the transition region is lower than in the working region.

For example, a pressure of between 0 and 10 bar can be present in the working chamber, and a pressure of approximately 5 bar in the transition region.

To sterilize the transition region or the gray room, it is preferably possible to allow a sterilization medium to flow through it.

For this purpose, it is conceivable that an air spring chamber not only be provided with an inlet, but also with an outlet and in particular a switchable outlet, so that a uniform flow can be generated.

The air spring outlets can preferably be connected in parallel. Preferably, however, one, and in particular exactly one, gas flow is provided.

In a further preferred embodiment, the valve device and/or the valve arrangement has at least one sensor device. Such sensor devices in the valve device and/or the valve arrangement can, for example, detect a pressure in the working chamber or the control chamber.

In addition, sensor devices can be provided which detect a temperature and/or a concentration of a sterilization medium-advantageously, to ensure and/or record that proper sterilization has taken place.

Preferably, several of the valve devices of the apparatus according to the invention are designed in the manner described above.

A pneumatically-controlled valve device is understood in particular to mean that control air or the like is provided to switch this valve from a closed position to an open position, and/or from an open position to a closed position. In the open position, the plastic preforms are preferably applied with a working pressure.

In a preferred embodiment, the valve device has a movable and in particular linearly-movable valve piston, wherein, in a first position of this valve piston, the valve device is closed, and thus no gaseous medium passes through the valve device to the application device. Preferably, in a second position of this valve piston, the valve device is open, and the gaseous medium or the blowing air reaches the application device.

The flowable sterilization medium can be hydrogen peroxide or peracetic acid in particular. In the prior art, there are no valves that can be completely sterilized in this way.

Preferably, the application devices in each case have blowing nozzles, or are blowing nozzles. These can be placed at the mouth of the plastic preforms to be expanded, or even in the region of a blow mold, in order to apply the plastic preforms with the individual pressures to expand them.

Furthermore, the forming stations preferably in each case have blow molds within which the plastic preforms are expanded or blown into the plastic containers.

These blow molds are particularly preferably constructed in at least two parts and preferably in at least three parts, and have, for example, two side parts and a bottom part.

The compressed air reservoir which stores the air pressure is particularly preferably in flow connection with the individual valve arrangements or valve blocks and more precisely with the individual valve devices, or can be brought into such a connection. This can be done in such a way that the corresponding working pressure is always applied to the valve device.

In a preferred embodiment, the reservoirs are annular channels. Particularly preferably, the at least one reservoir and preferably several reservoirs are arranged on the rotatable carrier-hereafter also referred to as the blowing wheel.

In a further advantageous embodiment, all materials of the valve devices that come into contact with the sterilization medium enable corresponding sterilization with this sterilization medium.

In a further preferred embodiment, the apparatus has a sterilization device which is suitable for applying the sterilization medium to one or more valve devices. In particular, the sterilization medium can be applied to those flow paths or those spaces of the valve device that also convey the working fluid, and in particular the blowing air, during a working mode.

The aforementioned valve piston is particularly preferably arranged in an aseptic chamber of the apparatus.

In a preferred embodiment, the valve device is an aseptic or pneumatically-controlled valve and, as described in detail below, a bellowless valve.

Particularly preferably, both a control chamber of this valve device, in which the control air for switching the valve is guided, and a working chamber of this valve device, in which the blowing air for expanding the plastic preforms is guided and/or stored at least temporarily, can be completely sterilized.

In the case of valves known from the prior art, the available control components are generally not able to be sterilized in terms of material, and there is also no clearly defined limit to a sterile room. Therefore, in the context of the invention, a novel, and in particular aseptic, valve device is proposed.

In a preferred embodiment, the valve device has a valve—in particular, a directional control valve and in particular an aseptic directional control valve. This valve in turn actuates a piston valve and/or the aforementioned valve piston (in particular, to block the blowing air or to allow it to reach the application device).

It is possible for this directional control valve to be fitted with a bellows or a diaphragm, so that aseptic separation between a control air and a clean room can take place in this way.

In a preferred embodiment, the valve device is designed without a bellows. In the prior art, bellows are sometimes provided which separate the aseptic and non-aseptic regions of the valve device. These bellows often have the disadvantage that they are attacked by sterilization agents and are damaged in this way. In addition, bellows of this type often cannot withstand heating. This means that, in cases where the valve is put into working mode very quickly after sterilization, the material is still too soft, and this can lead to malfunctions or damage of the bellows.

Particularly preferably the control chamber and the working chamber are completely separated from one another in terms of fluid technology. Non-aseptic air is typically used to control the valve. This design prevents this air from contaminating the actual working air, and thus prevents contaminated working air from entering the containers.

In a further advantageous embodiment, the apparatus has a clean room within which the plastic preforms to be formed are transported. In particular, the plastic preforms can be transported through this clean room during their expansion. Preferably, the forming stations can also be transported through this clean room.

A clean room is understood to mean a room area or a room within which the air has a higher degree of purity or a lower number of germs than in an environment. Different degrees of purity can be provided—for example, a degree of purity that is only 1/10 or even 1/100 of the germ concentration compared to the environment. This clean room is preferably separated from a (non-sterile) environment.

Particularly preferably the plastic preforms are transported through this clean room while they are applied with the gaseous medium for their expansion.

Preferably, the clean room has at least two walls delimiting it, which are preferably movable relative to one another.

The apparatus particularly preferably has a sealing device that seals the clean room from the environment. This can be a hydraulic seal, for example. Particularly preferably, the apparatus has two sealing devices, and in particular two water locks, which are suitable and intended to seal the clean room from the environment.

The aforementioned piston device of the valve device, which controls the blowing air, is particularly preferably always located inside this clean room.

Particularly preferably, the apparatus is designed such that the pressure of the working air, which is used to expand the containers, is always greater than the pressure of the control air, which is used to actuate the valve device.

Particularly preferably, a pressure of the working air is greater than 5 bar, preferably greater than 7 bar, and preferably greater than 10 bar. Particularly preferably, a pressure of the working air is less than 60 bar, preferably less than 50 bar, preferably less than 40 bar, and preferably less than 30 bar.

The pressure of the control air is preferably greater than 1 bar, preferably greater than 2 bar, and preferably greater than 3 bar. Furthermore, the pressure of the control air is less than 15 bar, preferably less than 12 bar, and particularly preferably less than 10 bar. The design of these pressure ratios ensures that the non-aseptic control air does not enter the aseptic working air even if the diaphragm or bellows is damaged.

In a further advantageous embodiment, the apparatus has a second compressed air reservoir that is suitable and intended to provide compressed air at a second predefinable pressure, wherein such second pressure is higher than the first pressure. For example, the second pressure can be a final blowing pressure, with which the container is preferably finally formed, and its final shape determined.

In a further advantageous embodiment, the apparatus has a third compressed air reservoir that is suitable and intended to provide compressed air at a third predefined pressure, wherein this third pressure preferably is greater than the first pressure and preferably is less than the second pressure.

In particular, this pressure can be the so-called intermediate blowing pressure, which is used in newer methods for the production of plastic containers. Particularly preferably, the second compressed air reservoir and the third compressed air reservoir can also be brought via valve devices into flow connection with the application device and finally with the plastic preform to be expanded.

Particularly preferably, the valve devices that control the application of the second pressure and the third pressure to the container are also the valves described above, which are particularly preferably completely sterilizable.

Particularly preferably, the second compressed air reservoir and/or the third compressed air reservoir is also an annular channel that is arranged on the blowing wheel.

With the further advantageous embodiment, the forming stations each have rod-like bodies, and in particular so-called stretching rods, which can be inserted into the plastic preforms in order to expand them in the longitudinal direction thereof.

In a further preferred embodiment, the piston of the valve device (or the valve piston) is partially or completely pressure-compensated. This means that no resulting force, or only a very small resulting force, acts upon the piston due to the pressures applied.

In a further advantageous embodiment, a guide device for the (valve) piston is provided. This is preferably arranged in such a way that a sterilization medium can reach anywhere around the piston. An exception to this can be a corresponding seal, since this area can then also be sterilized by the movement during sterilization.

The valve device particularly preferably has at least one sensor device. For example, the sensor device can be a pressure-measuring device that determines a pressure of the working air and/or the control air within the valve device. This ensures that the pressure of the working air is always higher than the pressure of the control air.

In a further preferred embodiment, sensor devices can be provided on or in the valve device that, for example, determine a pressure or a temperature and/or a concentration of the sterilization agent. In this way, it is possible to record the sterilization of the valve device and/or check whether proper sterilization has taken place.

The present invention is further directed to a method for forming plastic preforms into plastic containers, wherein a transport device transports the plastic preforms along a predefined transport path, and wherein the transport device comprises a movable and in particular a rotatable transport carrier on which a plurality of forming stations for forming the plastic preforms are arranged.

Such forming stations in each case have application devices that apply the plastic preforms with a flowable and, in particular, gaseous medium to expand them. Furthermore, the apparatus has at least one first compressed air reservoir that stores compressed air at a first predefined pressure, and each forming station has a valve arrangement with a plurality of valve devices in order to apply at least two different pressures to the plastic preforms.

Furthermore, one of such valve devices is pneumatically controlled and/or actuated.

According to the invention, this valve device has a working chamber that receives and/or provides the gaseous medium, used to act upon the plastic preforms, and a valve piston that can be moved between at least two positions (in particular, to switch the valve device between a closed and an open position), wherein the valve device furthermore has a control chamber that is applied with a gaseous control medium for moving the valve piston, and wherein a transition region is arranged between the working chamber and the control chamber.

In a further preferred method, a higher pressure prevails in the working chamber of the valve device, which serves to receive the gaseous medium acting upon the plastic preforms, during a working mode than in the control chamber, which serves to receive a control fluid that moves a valve piston of the valve device.

Preferably, the apparatus is operated temporarily in a working mode, in which plastic preforms are formed into plastic containers, and temporarily in a sterilization mode, in which components of the apparatuses and in particular the valve devices are sterilized.

The present invention is further directed to the use of a pneumatically-controlled valve device for operating a forming device for forming plastic preforms into plastic containers and, in particular, a stretch blow-molding machine.

According to the invention, this valve device has a working chamber for receiving the gaseous medium, used to act upon the plastic preforms, and a valve piston movable between at least two positions, and the valve device further has a control chamber that can be acted upon by a gaseous control medium for moving the valve piston, and a transition region is arranged between the working chamber and the control chamber.

Further advantages and embodiments can be seen in the accompanying drawings:

DETAILED DESCRIPTION OF THE INVENTION

Figure 1:
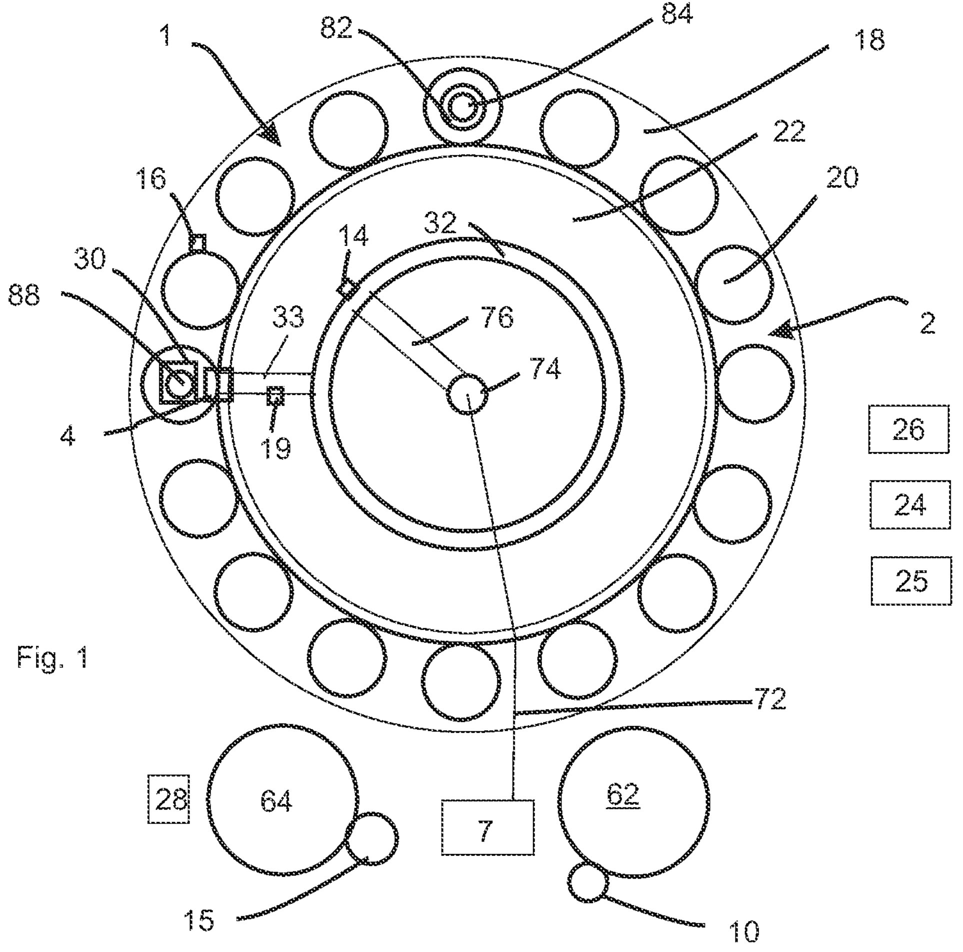
FIG. 1 shows a schematic representation of an apparatus according to the invention.

FIG. 1 shows an apparatus 1 for forming plastic preforms 10 into plastic containers 15. This apparatus has a transport device 2 for transporting the plastic preforms with a rotatable carrier 22, on which a plurality of forming stations 20 are arranged. These individual forming stations each have blow-molding devices 82, which in their interior form a cavity for expanding the plastic preforms.

The reference sign 84 denotes an application device, which is used to expand the plastic preforms 10. This can be a blow nozzle, for example, which can be applied to a mouth of the plastic preforms 10 in order to expand them. In addition, it is also conceivable to seal the blowing nozzle on the blow-molding device. Preferably, this application device is movable in a longitudinal direction, and preferably exclusively in a longitudinal direction of the plastic preforms.

The reference sign 4 denotes a valve arrangement, such as a valve block, which preferably has a plurality of valve devices that control the application of different pressure levels to the plastic preforms. Each forming station preferably has such a valve block.

Preferably, a throttle device is also arranged on each of these valve arrangements, which controls the flow cross-section of the compressed air fed to the plastic preforms under at least one pressure. As mentioned above, at least some of such valve devices and preferably all of such valve devices can be sterilized.

In a preferred method, first, a pre-blowing pressure P1, then, at least one intermediate blowing pressure Pi that is higher than the pre-blowing pressure, and, finally, a final blow-molding pressure P2 that is higher than the intermediate blowing pressure Pi1 are applied to the plastic preforms. Particularly preferably, the plastic preforms are applied with a further intermediate blowing pressure Pi2 which is greater than the pressure Pi1, but smaller than the pressure P2.

After expansion of the plastic containers, the pressures or compressed air are preferably returned from the container to the individual pressure reservoirs.

The apparatus therefore preferably has an air recycling device that is suitable and intended to return compressed air from the individual forming stations to compressed air reservoirs, and in particular compressed air reservoirs that accommodate a lower pressure level.

The reference sign 88 denotes a stretching rod used to expand the plastic preforms in their longitudinal direction. Preferably, all forming stations have such blow molds 82 and stretching rods 88. This stretching rod is preferably a component of a stretching device denoted by 30. The stretching rod is (preferably, also exclusively) movable in the longitudinal direction of the plastic preforms 10.

Preferably, the number of such forming stations 4 is between 2 and 100, preferably between 4 and 60, and preferably between 6 and 40.

The plastic preforms 10 are fed to the apparatus via a first transport device 62, such as in particular, but not exclusively, a transport starwheel. The plastic containers 15 are transported away via a second transport device 64.

The reference sign 7 denotes a pressure supply device, such as a compressor or also a compressed-air connection. The compressed air is conveyed via a connecting line 72 to a rotary distributor 74 and from there passed on via a further line 76 to the first compressed air reservoir 32, which in this case is an annular channel.

Thus, preferably, such rotary distributor serves the purpose of feeding air from a stationary part of the apparatus into a rotating part of the apparatus.

In addition to such annular channel 32 shown, further annular channels are preferably provided, which are, however, concealed by—for example, lie underneath—the annular channel 32 in the illustration shown in FIG. 1. Accordingly, one pressure reservoir each is available for storing the pressure P2, as well as the intermediate blowing pressures Pi1 and Pi2 and the pressure P1.

The reference sign 33 denotes a connecting line that delivers the compressed air to a forming station 20 or the valve block 4 thereof. Preferably, each of the annular channels is connected to all forming stations via corresponding connecting lines. Such connecting line 33 is preferably arranged in the rotating part of the apparatus.

The reference sign 18 schematically denotes an optional clean room, which is here preferably annular and surrounds the transport path of the plastic preforms 10. Preferably, a (geometric) axis of rotation with respect to which the transport carrier 22 is rotatable is arranged outside the clean room 18. Preferably, the clean room 18 is sealed from the non-sterile environment by a sealing device, which preferably has at least two water locks. Preferably, this clean room is ring-shaped or torus-shaped.

Furthermore, the apparatus preferably has a cover device (not shown in FIG. 1), which delimits the clean room 18 upwards. This cover device is preferably arranged on at least one of the stretching devices 30.

The apparatus has a plurality of measuring and/or sensor devices which serve to control the apparatus. The reference sign 14 denotes a pressure-measuring device which measures an air pressure within the compressed air reservoir 32. The other compressed air reservoirs also preferably have corresponding pressure-measuring devices.

The reference sign 16 denotes a further pressure-measuring device which measures an air pressure—in particular, a container interior pressure of the plastic preform to be expanded. Preferably, such a pressure-measuring device is assigned to each forming station.

Preferably, the valve devices themselves also in each case have at least one and preferably several sensor devices such as pressure-measuring devices. In addition, the valve devices can also have sensor devices for detecting the concentration of a sterilization medium.

Preferably, the apparatus has a sterilization device that is suitable and intended to act upon the individual valve devices with a flowable sterilization medium. Preferably, this sterilization takes place in a sterilization mode that is different from a working mode of the apparatus.

The reference sign 19 also schematically denotes a flow-measuring device which determines a flow of the blowing air from a compressed air reservoir to the valve block 4 of a forming station 20. Preferably, corresponding flow-measuring devices are each arranged between a compressed air reservoir and all forming stations.

Additional flow-measuring devices can also be assigned between the additional compressed air reservoirs and the respective forming stations.

Furthermore, position-detection devices are preferably also provided which can detect positions of the stretching rods of the individual forming stations.

The reference sign 24 denotes a control device which controls and in particular regulates the apparatus 1. This control device is preferably also able to change the working parameters of the apparatus and in particular the settings of the throttle device.

The control device accordingly controls in particular the individual valve devices and hence the application to the plastic preforms of the individual pressure levels. In addition, the control device preferably also controls a movement of the stretching rods of the individual forming stations. Preferably, the control device also controls movements of the application devices, i.e., the blowing nozzles. As mentioned, this control device can preferably also adjust the settings of the individual throttle devices.

The control device is preferably suitable for controlling the points in time at which the application devices are applied to the plastic preforms and/or the points in time at which the blow-molding devices are again lifted from the plastic preforms, and in particular also for changing these points in time.

The reference sign 26 denotes a memory device in which in particular measured variables are detected—in particular, pressure values and flow values, but also corresponding working parameters. Preferably, these respective values are saved with a temporal assignment.

These values can preferably be saved continuously and in particular over long periods of machine operation. The control device controls or regulates the apparatus, also taking into account these recorded measured values.

The reference sign 28 roughly schematically denotes an inspection device for inspecting the manufactured containers.

The reference sign 25 denotes a display device which serves to output information to a machine operator. By means of this display devices, measured pressure (characteristic) curves can be output, for example.

Figure 2:
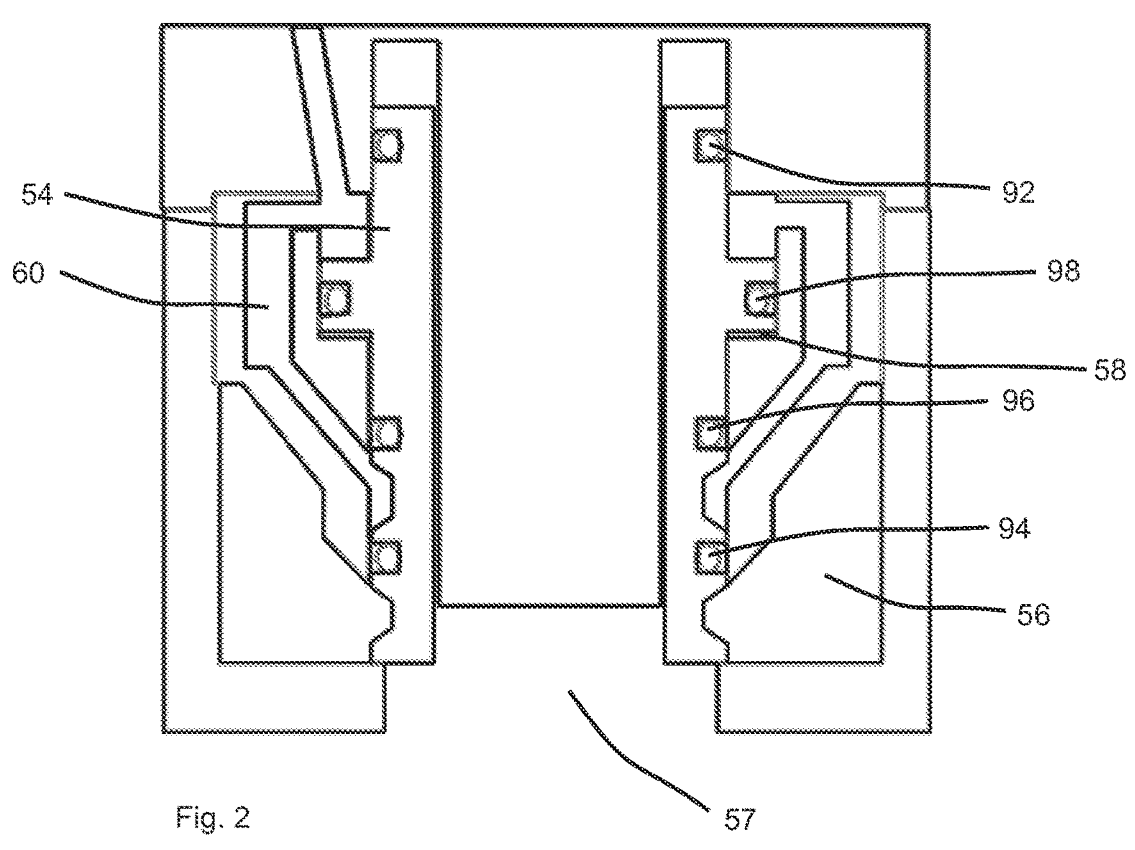
FIG. 2 shows a schematic representation of a valve device in a closed state.
Figure 3:
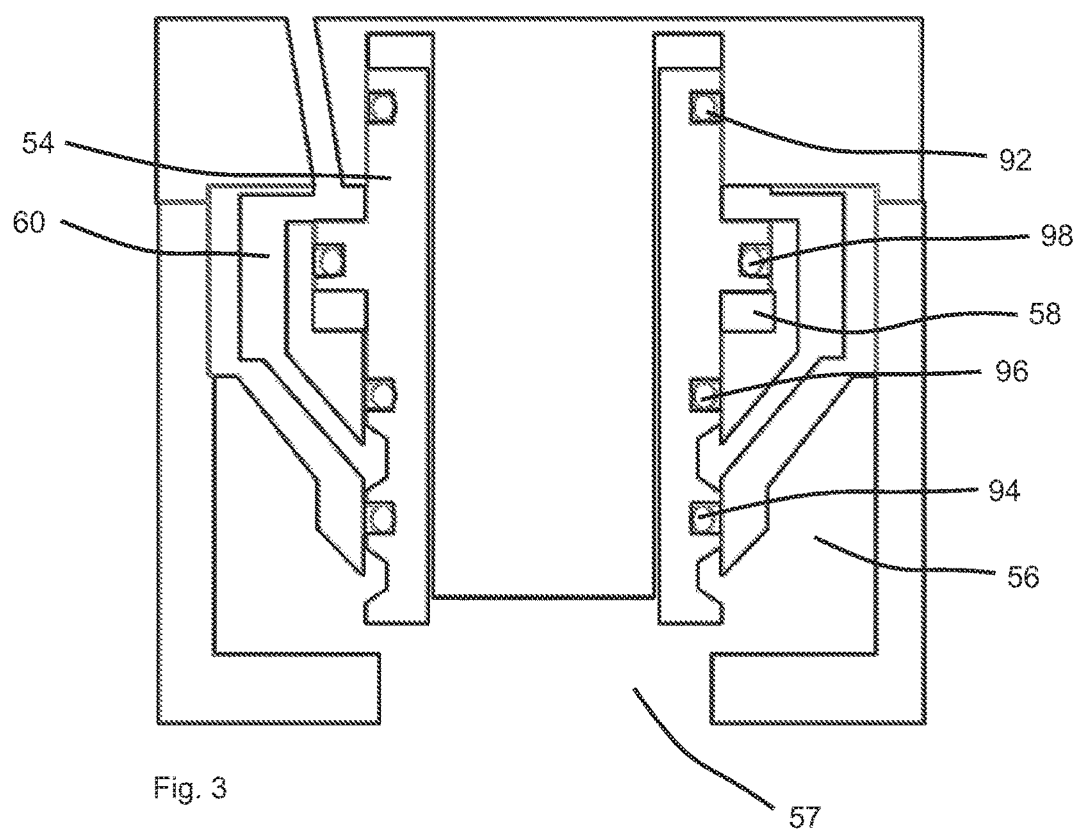
FIG. 3 shows a representation of the valve device in an open state.

FIGS. 2 and 3 show a valve device 50 according to the invention-once in a closed state (FIG. 2) and once in an open state (FIG. 3). The reference sign 56 refers to a working chamber that can be applied with the gaseous medium used to expand the plastic preforms. Preferably, this blowing pressure is permanently applied to this working chamber 56. The reference sign 57 denotes an outlet opening of the valve device, which is in flow connection with the application device, and thus with the plastic preform.

The reference sign 54 denotes a valve piston, which is shown in FIG. 2 in a closed position and in FIG. 3 in an open position of the valve device 50.

The reference sign 58 denotes a control chamber that can be applied with (non-sterile) control air in order to move the valve piston 54.

Due to the structure of the valve device, it can be divided into three zones, and specifically a first zone in which the working chamber 56 is located, a transition region or a second zone or transition zone, and a third zone in which the control chamber is located.

The reference sign 94 denotes a sealing device and in particular an O-ring, which seals the working chamber from the intermediate region 60. The reference sign 96 denotes a sealing device and preferably also an O-ring or the like, which seals off the control chamber 58 from the transition region 60.

A circumferential volume 60, which is preferably subjected to sterile air, is formed in the transition region. The reference signs 92 and 98 denote further sealing devices that additionally seal this transition region 60 both with respect to the control chamber 58.

The applicant reserves the right to claim all features disclosed in the application documents as essential to the invention, provided that they are novel with respect to the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

The invention claimed is:

1. An apparatus for forming plastic preforms into plastic containers, having a transport device that transports the plastic preforms along a predefined transport path, wherein the transport device has a transport carrier on which a plurality of forming stations for forming the plastic preforms are provided, wherein the forming stations in each case have application devices configured to apply the plastic preforms with a flowable medium for their expansion, and wherein the apparatus has at least one first compressed air reservoir that is configured to provide compressed air at a first predefined pressure, and each forming station has a valve arrangement with a plurality of valve devices configured to apply the plastic preforms with at least two pressures, wherein at least one of the valve devices is a pneumatically-controlled valve device, wherein the valve device has an aseptic working chamber configured for receiving the gaseous medium, used to act upon the plastic preforms, and a valve piston configured to be movable between at least two positions, and the valve device further has a non-aseptic control chamber configured to be applied with a gaseous control medium for moving the valve piston, wherein at least one transition region is arranged between the aseptic working chamber and the non-aseptic control chamber, wherein the transition region acts as a gray room which separates the aseptic working chamber from the non-aseptic control chamber, wherein the non-aseptic control chamber is sealed off from the transition region by at least one first sealing device, and/or the transition region is sealed off from the aseptic working chamber with at least one second sealing device, and wherein the first sealing device, which seals off the non-aseptic control chamber from the transition region, is configured such that it never contacts an aseptic region of the aseptic working chamber.

2. The apparatus according to claim 1, wherein the working chamber and/or the transition region can be sterilized.

3. The apparatus according to claim 1, wherein the transition region is configured to act as a compression spring for pretensioning the piston device.

4. The apparatus according to claim 1, wherein the valve arrangement and/or the valve device has at least one sensor device.

5. The apparatus according to claim 1, wherein the valve device is designed without a bellows.

6. The apparatus according to claim 1, wherein the apparatus has a clean room within which the plastic preforms to be formed are transported.

7. The apparatus according to claim 1, wherein a control pressure for actuating the valve device is lower than a pressure of the gaseous medium for expanding the plastic preforms.

8. The apparatus according to claim 1, wherein the apparatus has a second compressed air reservoir that is configured to provide compressed air at a second predefined pressure, wherein such second pressure is higher than the first pressure.

9. The apparatus according to claim 1, wherein the apparatus is configured to be operated both in a working mode, in which the plastic preforms are formed, and in a sterilization mode, in which the apparatus and/or the valve device is sterilized.

10. The apparatus according to claim 1, wherein the apparatus has a third compressed air reservoir that is configured to provide compressed air at a third predefined pressure, wherein this third pressure preferably is greater than the first pressure and is less than the second pressure.

11. The apparatus according to claim 1, wherein the pressure in the transition region is lower than in the working region.

12. The apparatus according to claim 2, wherein the working chamber and/or the transition region are sterilized by a flowable sterilization medium selected from hydrogen peroxide and peracetic acid.

13. The apparatus according to claim 1, wherein a pressure of the working air/gaseous medium is greater than 5 bar.

14. The apparatus according to claim 1, wherein a pressure of the control air/gaseous control medium is greater than 1 bar.

15. A method for forming plastic preforms into plastic containers, wherein a transport device transports the plastic preforms along a predefined transport path, wherein the transport device has a transport carrier on which a plurality of forming stations for forming the plastic preforms are arranged, wherein the forming stations in each case have application devices that apply the plastic preforms with a flowable medium for their expansion, and wherein the apparatus has at least one first compressed air reservoir that provides compressed air at a first predefined pressure, and each forming station has a valve arrangement with a plurality of valve devices in order to apply the plastic preforms with the at least two pressures, wherein at least one of the valve devices is pneumatically controlled, wherein the valve device has an aseptic working chamber that receives the gaseous medium, used to act upon the plastic preforms, and a valve piston that can be moved between at least two positions, and the valve device further has a non-aseptic control chamber that can be applied with a gaseous control medium for moving the valve piston, and wherein a transition region is arranged between the aseptic working chamber and the non-aseptic control chamber, wherein the transition region acts as a gray room which separates the aseptic working chamber from the non-aseptic control chamber, wherein the non-aseptic control chamber is sealed off from the transition region by at least one first sealing device, and/or the transition region is sealed off from the aseptic working chamber with at least one second sealing device, and wherein the first sealing device, which seals off the non-aseptic control chamber from the transition region, is configured such that it never contacts an aseptic region of the aseptic working chamber.

16. A method for operating a forming device for forming plastic preforms into plastic containers, comprising providing a pneumatically controlled valve device, wherein the valve device has an aseptic working chamber for receiving the gaseous medium, used to act upon the plastic preforms, and a valve piston that can be moved between at least two positions, and the valve device further has a non-aseptic control chamber that can be applied with a gaseous control medium for moving the valve piston, wherein a transition region is arranged between the aseptic working chamber and the non-aseptic control chamber, wherein the transition region acts as a gray room which separates the aseptic working chamber from the non-aseptic control chamber;

wherein the non-aseptic control chamber is sealed off from the transition region by at least one first sealing device, and/or the transition region is sealed off from the aseptic working chamber with at least one second sealing device, wherein the first sealing device, which seals off the non-aseptic control chamber from the transition region, is configured such that it never contacts an aseptic region of the aseptic working chamber; and controlling operation of the forming device using said valve device.

* * * * *